(12) United States Patent
Andersen et al.

(10) Patent No.: US 10,199,970 B2
(45) Date of Patent: Feb. 5, 2019

(54) METHOD FOR HANDLING AN OVER VOLTAGE RIDE THROUGH EVENT

(71) Applicant: VESTAS WIND SYSTEMS A/S, Aarhus N (DK)

(72) Inventors: Gert Karmisholt Andersen, Hovedgård (DK); Leif Svinth Christensen, Thorsø (DK); Ciprian Biris, Hinnerup (DK); Uffe C. Merrild, Bryrup (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 15/563,754

(22) PCT Filed: Mar. 8, 2016

(86) PCT No.: PCT/DK2016/050065
§ 371 (c)(1),
(2) Date: Oct. 2, 2017

(87) PCT Pub. No.: WO2016/155739
PCT Pub. Date: Oct. 6, 2016

(65) Prior Publication Data
US 2018/0091077 A1   Mar. 29, 2018

(30) Foreign Application Priority Data
Apr. 1, 2015   (DK) ................. 2015 70193

(51) Int. Cl.
*H02P 9/00* (2006.01)
*H02P 9/04* (2006.01)
*H02P 9/10* (2006.01)

(52) U.S. Cl.
CPC .............. *H02P 9/102* (2013.01); *H02P 9/007* (2013.01); *H02P 9/04* (2013.01); *H02P 9/10* (2013.01)

(58) Field of Classification Search
USPC ........................ 322/28; 290/44, 55
See application file for complete search history.

(56) References Cited

U.S. PATENT DOCUMENTS 6,853,094 B2 *  2/2005  Feddersen ............. F03D 7/0224
                                                              290/44
6,856,040 B2 *  2/2005  Feddersen ............. F03D 7/0224
                                                              290/44

(Continued)

FOREIGN PATENT DOCUMENTS

WO    2011120523 A2   10/2011
WO    2014032256 A1    3/2014

OTHER PUBLICATIONS

Markus Fischer et al: "Fault ride through performance of wind energy converters with FACTS capabilities in response to up-to-date German grid connection requirements," Power Systems Conference and Exposition (PSCE), 2011 IEEE/ PES, IEEE, Mar. 20, 2011 (Mar. 20, 2011). pp. 1-6 [Abstract Only].

(Continued)

*Primary Examiner* — Pedro J Cuevas
(74) *Attorney, Agent, or Firm* — Patterson + Sheridan, LLP

(57) ABSTRACT

The present invention relates to a method for operating a doubly fed induction generator wind power facility during an OVRT event, said the wind turbine facility being adapted to inject active and/or reactive current into an associated grid, the method comprising the steps of determining the occurrence of an over voltage grid event, and maintaining a grid-side inverter of the doubly fed induction generator wind power facility fully operable during the over voltage ride though event so as to maintain a controllable active and/or reactive current capability during the over voltage grid event.

14 Claims, 3 Drawing Sheets

(56) References Cited

U.S. PATENT DOCUMENTS

| | | | |
|---|---|---|---|
| 6,856,041 B2* | 2/2005 | Siebenthaler | F03D 7/0224 290/44 |
| 6,933,625 B2* | 8/2005 | Feddersen | F03D 7/0224 290/44 |
| 7,015,595 B2* | 3/2006 | Feddersen | F03D 7/0224 290/44 |
| 8,198,742 B2* | 6/2012 | Jorgensen | F03D 7/0224 290/44 |
| 8,577,508 B2* | 11/2013 | Li | H02M 7/53875 700/287 |
| 2003/0151259 A1* | 8/2003 | Feddersen | F03D 7/0224 290/44 |
| 2004/0217594 A1* | 11/2004 | Feddersen | F03D 7/0224 290/44 |
| 2004/0217595 A1* | 11/2004 | Feddersen | F03D 7/0224 290/44 |
| 2004/0217596 A1* | 11/2004 | Feddersen | F03D 7/0224 290/44 |
| 2004/0222642 A1* | 11/2004 | Siebenthaler | F03D 7/0224 290/44 |
| 2009/0206606 A1* | 8/2009 | Jorgensen | F03D 7/0224 290/44 |
| 2010/0109328 A1* | 5/2010 | Li | H02M 7/53875 290/44 |
| 2010/0327584 A1 | 12/2010 | Fortmann | |
| 2013/0077367 A1 | 3/2013 | Zhu et al. | |
| 2015/0073610 A1 | 3/2015 | Schnetzka et al. | |
| 2015/0333677 A1* | 11/2015 | Letas | H02J 3/386 290/44 |
| 2018/0080434 A1* | 3/2018 | Carr | F03D 9/003 |

OTHER PUBLICATIONS

Danish Search Report, for CVR-P No. 1040272, dated Sep. 25, 2015.

International Search Report for Application No. PCT/DK2016/050065 dated Jun. 6, 2016.

* cited by examiner

METHOD FOR HANDLING AN OVER VOLTAGE RIDE THROUGH EVENT

FIELD OF THE INVENTION

The present invention relates to a method for handling over voltage ride through (OVRT) events. In particular, the present invention relates to a method for handling OVRT events in relation to doubly fed induction generator (DFIG) systems.

BACKGROUND OF THE INVENTION

Over the recent years various demands regulating the behaviour of for example wind turbine facilities during grid faults have been suggested. Recent grid demands require that wind turbine facilities remain connected to the grid during over voltage grid events and at the same time support the grid during such events.

EP 2 704 309 A2 discloses a method for controlling a dual-fed induction generator (DFIG) in response to an over voltage grid event. The method involves that an output of a closed-loop portion of a rotor current regulator is set to a fixed value such that a predictive feed-forward path sets an internal voltage for the DFIG. Moreover, the method involves that a condition of a high DC voltage on a DC link or a condition predictive of high DC voltage on the DC link is detected, and in response a rotor related current command is reduced to approximately zero. Thus, the method suggested in EP 2 704 309 A2 aims at protecting the DFIG during the over voltage grid event by setting the rotor related current command to approximately zero. It is a disadvantage of this approach that even though the DFIG is protected during the over voltage grid event the grid itself is not supported appropriately during the event.

It may be seen as an object of embodiments of the present invention to provide a method for supporting the grid during an OVRT event.

It may be seen as a further object of embodiments of the present invention to provide a method for maintaining a grid-side inverter fully operable during an OVRT event.

It may be seen as an even further object of embodiments of the present invention to provide a method for ensuring that a grid-side inverter is capable of injecting both active and reactive power into an associated grid during an OVRT event.

DESCRIPTION OF THE INVENTION

The above-mentioned objects are complied with by providing, in a first aspect a method for operating a DFIG during an OVRT event, said DFIG being adapted to inject active and/or reactive current into an associated grid, the method comprising the steps of
1) determining the occurrence of an over voltage grid event, and
2) maintaining a grid-side inverter of the DFIG fully operable during the OVRT event so as to maintain a controllable active and/or reactive current capability during the OVRT event.

In the present content the term fully operable should be taken to mean that the active switches of the grid-side inverter remains fully controllable. The active switches of the grid-side inverter may be insulated gate bipolar transistors (IGBTs).

When an over voltage grid event has been detected the DFIG enters an abnormal working condition until the grid voltage returns to a predetermined voltage range. This predetermined voltage range may be a user defined voltage, such as for example the range between 0.9 pu and 1.1 pu, where 1 pu corresponds to the nominal grid voltage.

The presence or occurrence of the over voltage grid event may be determined from a grid voltage measurement. The grid voltage measurement may comprise measurement of a root means square (RMS) voltage grid value. Alternatively, if a fast response is required the grid voltage measurement may comprise measurement of a peak voltage grid value. The trigger level for entering the abnormal working condition may be user defined, and it may for example fall within the grid voltage range 1.05-1.2 pu. It should be noted however that other grid voltage ranges are applicable as well.

The fact that the DFIG maintains its controllable active and/or reactive power capabilities should be taken to mean that the grid-side inverter may absorb reactive current during the OVRT event in order to lower the grid-side inverter terminal voltage. If a certain total amount of reactive current is to be injected into the associated grid the amount of reactive current injected from the stator may be adjusted accordingly.

The method of the present invention may provide that at least the total active power level injected into the associated grid during the OVRT event remains essentially unchanged compared to the injected active power level prior to the occurrence of the over voltage grid event. Alternatively, the total active power level injected into the associated grid during the OVRT event may follow a power reference signal.

In a DFIG the total amount of active power injected into the grid equals the sum of the active power delivered by the stator and the active power delivered via the grid-side inverter.

The amount of reactive current to be absorbed may follow a predetermined dependency with respect to the grid voltage during the OVRT event. In fact, the amount of reactive current to be absorbed may follow one of a plurality of predetermined dependencies with respect to the grid voltage during the OVRT event. This plurality of predetermined dependencies may be defined and subsequently selected from for example a look-up table.

The predetermined dependencies may involve essential linear dependencies, but other types of dependencies are also applicable.

The predetermined dependency to be applied may be selected among the plurality of dependencies in accordance with for example the strength of the grid. A relatively strong grid may withstand a steeper and more aggressive reactive current versus grid voltage dependency, whereas a less aggressive approach may advantageously be applied in relation to a relatively weak and perhaps isolated grid.

The principle of the present invention may be applicable on wind turbine levels as well as on power plant levels as long as the involved wind turbine are DFIGs.

In a second aspect the present invention relates to a computer program product for performing the method according to the first aspect when said computer program product is run on a computer or microprocessor. The computer or microprocessor may form part of a DFIG controller or a power plant controller.

In a third aspect the present invention relates to a DFIG being adapted to inject active and/or reactive current into an associated grid, the DFIG comprising
1) means for determining the occurrence of an over voltage grid event, and 2) means for maintaining a grid-side inverter of the DFIG fully operable during an OVRT event so as to maintain a controllable active and/or reactive current capability during the OVRT event.

The DFIG may form part of a single wind turbine. This single wind turbine may form part of a wind power plant comprising a plurality of such wind turbines.

The DFIG may further comprise means for measuring the grid voltage and control means for controlling the grid-side inverter, in particular the controllable active switches of the grid-side inverter. As previously stated the grid voltage to be measured may involve the RMS grid voltage or a peak voltage in case a fast response is required.

BRIEF DESCRIPTION OF THE DRAWINGS

The present invention will now be described in further details with reference to the accompanying figures, wherein.

Figure 1:
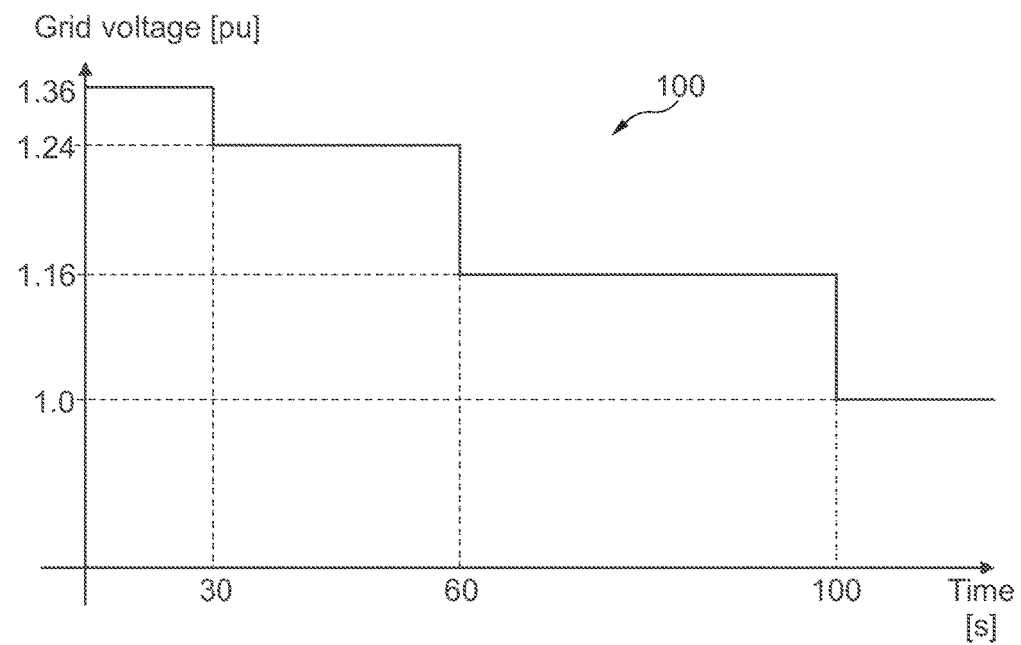
FIG. 1 shows an OVRT tolerance curve.

While the invention is susceptible to various modifications and alternative forms specific embodiments have been shown by way of examples in the drawings and will be described in details herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

In its most general aspect the present invention relates to a method for controlling a DFIG wind turbine facility during an OVRT event without losing control of a grid-side inverter including its ability to deliver active power to an associated grid during the OVRT event. The method of the present invention thereby facilitates that the delivery of active power to the associated grid may be upheld during an OVRT event, while, at the same time, reactive current is absorbed from the associated grid in order to lower the grid voltage. The reactive current absorption ensures that the grid-side inverter is kept fully operable. If a certain amount of total reactive current is to be injected into the associated grid the amount of reactive current from the stator can be adjusted accordingly.

Upon detection of the occurrence of an over voltage grid event the DFIG wind turbine facility goes from a normal working condition to an abnormal working condition.

FIG. 1 shows an example of an OVRT tolerance curve 100 where the grid voltage is mapped versus time. At grid voltage levels being below the tolerance curve the wind turbine facility should remain connected to the grid. As depicted in FIG. 1 the wind turbine facility should be able to operate at a grid voltage of 1.36 pu for 30 s. As previously stated a grid voltage of 1 pu corresponds to the nominal grid voltage. Above a grid voltage of 1.36 pu the wind turbine facility is allowed to trip immediately. Similarly, the wind turbine facility should be able to operate at 1.24 pu for another 30 s, and operate at 1.16 pu until 1000 s. It should be noted that OVRT tolerance curves may differ from the one depicted in FIG. 1. Thus, both the grid voltage levels as well as the associated time periods may be different from what is depicted in FIG. 1.

Figure 2:
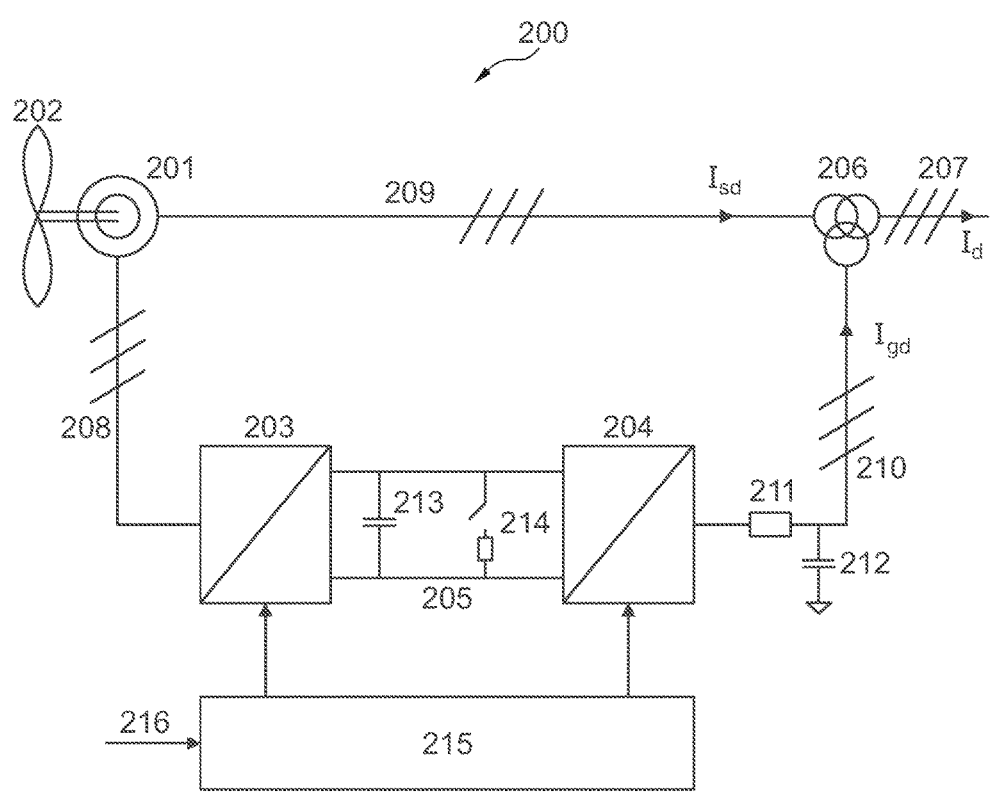
FIG. 2 shows a DFIG facility.

FIG. 2 shows a schematic of a typical DFIG configuration 200 where a wind turbine generator 201 is coupled to the grid 207 via two three-phase power branches. One of these power branches 209 connects the stator of the generator 201 to the main transformer 206 whereby power may be provided from the stator to the grid 207. Another power branch goes via a rotor-side converter 203, a grid-side inverter 204 and an intermediate DC link 205. The intermediate DC link 205 comprises a capacitor 213 and a DC chopper 214.

As depicted in FIG. 2 the rotor is connected to the rotor converter 203 via the three-phase power link 208. Similarly, the grid-side inverter 204 is connected to the main transformer 206 via the grid inverter choke 211 and the three-phase power link 210. A capacitor 212 is provided to ground. A wind turbine controller 215 controls the rotor-side converter 203 and the grid-side inverter 204 in response to a number of incoming control signals 216, such as a measurement of an actual grid voltage.

The main transformer 206 typically has different transformer ratios between the stator branch and the grid, and between the converter/inverter branch and the same grid.

As stated above the overall object of the present invention is to maintain full control over the grid-side inverter during an OVRT event. Thus, the present invention is concerned with maintaining full control over the controllable switches, such as over the IGBTs, of the grid-side inverter.

If the grid-side inverter should be maintained fully operable reactive current needs to be absorbed via this inverter whereby the terminal voltage of the grid-side inverter is kept at a level which allows full control of the inverter. As a result of maintaining full operation of the grid-side inverter active power may be provided to the grid as well.

During an over voltage grid event the grid voltage increases a certain amount above its nominal level. This certain amount may for example be 10%. Similarly, an under voltage event may be triggered when the grid voltage drops below for example 90% of its nominal value.

When the grid voltage increases during an over voltage grid event, the voltage in the converter/inverter branch 210 increases in a proportional manner taking the transformer ratio of the main transformer into account. A voltage drop will occur over the grid-side inverter choke 211 whereby the terminal voltage on the grid-inverter 204 is decreased. The voltage drop across the grid-side inverter choke 211 is proportional to the current, I, and the choke inductance, L, via the relation $V_C = I \cdot j\omega L$.

As addressed previously the object of the present invention is to ensure that the grid-side inverter 204 is maintained fully operable during an over voltage grid event. This fully operable state of the grid-side inverter 204 is ensured by absorbing an appropriate amount of reactive current via the grid-side inverter. The absorption of the reactive current via the grid-side inverter 204 generates a voltage drop across the grid-side inverter choke 211 whereby the terminal voltage on the grid-side inverter 204 can be kept below a critical threshold voltage level above which the grid-side inverter becomes uncontrollable.

The total active, $P_{WTG}$, and reactive, $Q_{WTG}$, power levels delivered to the grid are given by the respective sums of the active and reactive power contributions, i.e.

$$P_{WTG} = P_S + P_G$$

$$Q_{WTG} = Q_S + Q_G$$

where $P_S$ and $P_G$ are the active power levels from the stator and grid-side inverter branches, respectively, whereas $Q_S$ and $Q_G$ are the reactive power levels from the stator and grid-side inverter branches, respectively.

Similarly, the total active, $I_{AC}$, and reactive, $I_{REAC}$, current levels delivered to the grid are given by the respective sums of the active and reactive current contributions, i.e.

$$I=I_s+I_g$$

$$I_d=I_{sd}+I_{gd}$$

where $I_s$ and $I_g$ are the active current levels from the stator and grid-side inverter branches, respectively, whereas $I_{sd}$ and $I_{gd}$ are the reactive current levels from the stator and grid-side inverter branches, respectively.

Thus, if the total reactive current, $I_d$, should remain essentially constant during an OVRT event, and the inverter reactive current, $I_{gd}$, is altered in order to maintain the grid-side inverter fully operable, the stator reactive current, $I_{sd}$, has to be changed accordingly.

The present invention ensures that at least $P_{WTG}$ is not affected by the occurrence of an over voltage grid event. In order to lower the grid voltage an amount of reactive current must be absorbed by the grid-side inverter of the DFIG. This reactive current absorption ensures that the grid-side inverter is kept fully functional due to the lowered inverter terminal voltage. If a predetermined amount of total reactive current has to be injected into the associated grid, the amount of reactive current from the stator can be adjusted accordingly.

Figure 3:
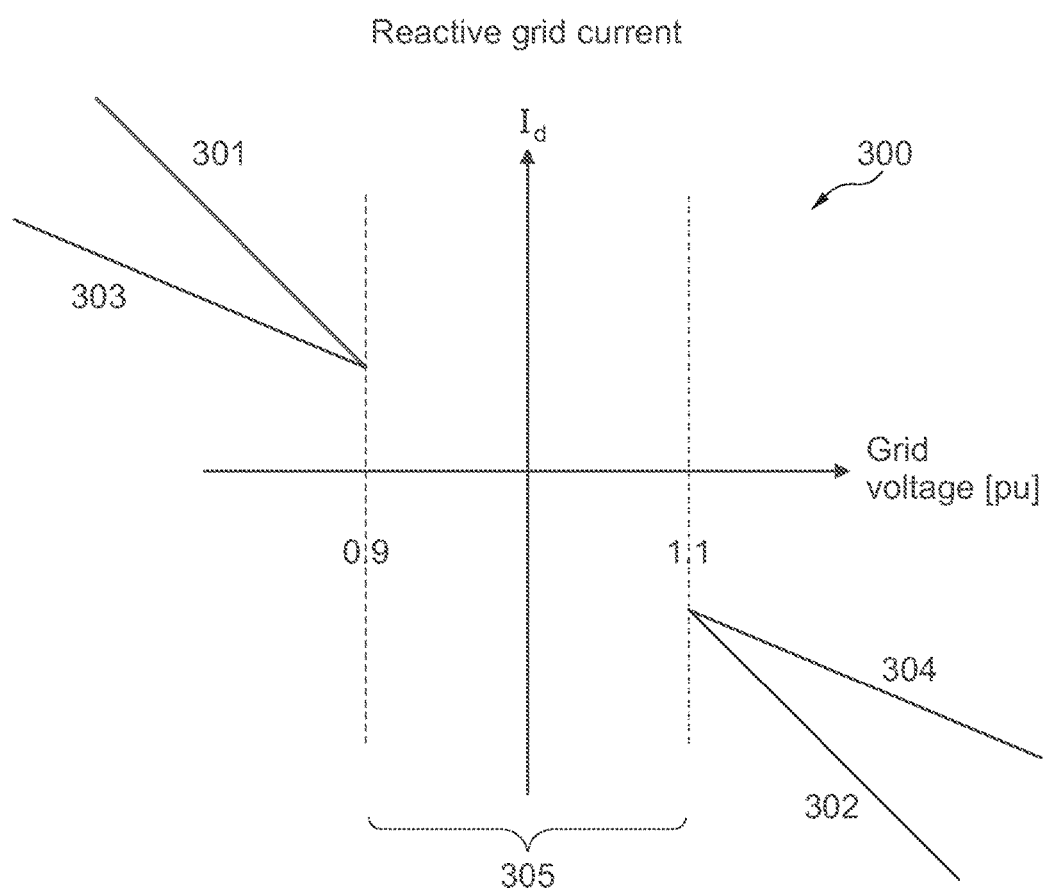
FIG. 3 shows the reactive current vs. grid voltage in an over voltage grid event.

FIG. 3 shows an example of a typical reactive grid current, $I_d$, versus grid voltage. The left hand side of FIG. 3 relates to under voltage events, whereas the right hand side relates to over voltage grid events. With reference to FIG. 2 the reactive grid current, $I_d$, equals the sum of the reactive stator current, $I_{sc}$, and the reactive inverter current, $I_{gd}$. As long as the grid voltage is between for example 0.9 and 1.1 pu, i.e. in region 305, no reactive power regulation is initiated. Obviously, these limits (0.9 and 1.1 pu) may be different.

In the under voltage region a positive reactive current must be injected into the grid in order to support the grid voltage. Two reactive current vs. grid voltage dependencies 301, 303 are depicted in FIG. 3. The strength and stability of the grid is often taken into account when the amount of reactive current to be injected is chosen. This means that in case of a weak and maybe isolated grid a less aggressive approach, like curve 303, may be selected. On the contrary, in case of a strong and stable grid a more aggressive approach, like curve 301, may advantageously be selected.

In case of an over voltage grid event reactive current must be absorbed from the grid in order to lower the grid voltage, and the terminal voltage of the grid-side inverter. Again the strength and stability of the grid may be taken into account when the amount of reactive current to be injected is chosen. Thus, a weak grid results in a less aggressive approach, cf. curve 304, whereas a strong grid is capable of handling a more aggressive approach, cf. curve 302.

When the grid voltage has been lowered via reactive current absorption, and again falls within the 305 region of FIG. 3 the wind turbine facility returns to a normal operation condition.

The invention claimed is:

1. A method for operating a doubly fed induction generator during an over voltage ride through event, said doubly fed induction generator being adapted to inject active and/or reactive current into an associated grid, the method comprising:
   determining an occurrence of the over voltage ride through event, and
   maintaining a grid-side inverter of the doubly fed induction generator fully operable during the over voltage ride through event so as to maintain a controllable active and/or reactive current capability during the over voltage ride through event.

2. A method according to claim 1, wherein the grid-side inverter is maintained fully operable by absorbing reactive current in a controllable manner during the over voltage ride through event.

3. A method according to claim 2, further comprising the step of injecting reactive current from the stator of the doubly fed induction generator into the associated grid.

4. A method according to claim 2, wherein the total reactive current absorption follows a predetermined dependency with respect to a grid voltage during the over voltage ride through event.

5. A method according to claim 4, wherein the total reactive current absorption follows one of a plurality of predetermined dependencies with respect to a grid voltage during the over voltage ride through event.

6. A method according to claim 5, wherein the plurality of predetermined dependencies are selectable from a look-up table.

7. A method according to claim 6, wherein the plurality of predetermined dependencies comprise essentially linear dependencies.

8. A method according to claim 6, wherein the total active power level injected into the associated grid during the over voltage ride through event is essentially unchanged compared to the injected active power level prior to the occurrence of the over voltage grid event.

9. A method according to any of claim wherein the total active power level injected into the associated grid during the over voltage ride through event follows a power reference signal.

10. A method according to claim 1, wherein the occurrence of the over voltage grid event is determined from a grid voltage measurement.

11. A method according to claim 10, wherein the grid voltage measurement comprises measurement of a RMS voltage value or a peak voltage value.

12. A computer program product for performing the method according to claim 1, when said computer program product is run on a computer or microprocessor.

13. A doubly fed induction generator being adapted to inject active and/or reactive current into an associated grid, the doubly fed induction generator comprising:
   means for determining the occurrence of an over voltage ride through event; and
   means for maintaining a grid-side inverter of the doubly fed induction generator fully operable during the over voltage ride through event so as to maintain a controllable active and/or reactive current capability during the over voltage ride through event.

14. A doubly fed induction generator according to claim 13, further comprising means for measuring the grid voltage.

* * * * *